(12) United States Patent
Gao (10) Patent No.: US 11,227,598 B2
(45) Date of Patent: Jan. 18, 2022

(54) METHOD FOR CONTROLLING TERMINAL BY VOICE, TERMINAL, SERVER AND STORAGE MEDIUM

(71) Applicant: TENCENT TECHNOLOGY (SHENZHEN) COMPANY LIMITED, Shenzhen (CN)

(72) Inventor: Guangyao Gao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 85 days.

(21) Appl. No.: 16/809,746

(22) Filed: Mar. 5, 2020

(65) Prior Publication Data

US 2020/0202860 A1 Jun. 25, 2020

Related U.S. Application Data

(63) Continuation of application No. PCT/CN2018/104264, filed on Sep. 6, 2018.

(30) Foreign Application Priority Data

Sep. 8, 2017 (CN) .......................... 201710804781.3

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/26* (2013.01); *G10L 15/30* (2013.01);
(Continued)

(58) Field of Classification Search
USPC ...................................................... 704/1–504
See application file for complete search history.

(56) References Cited

U.S. PATENT DOCUMENTS 7,289,964 B1* 10/2007 Bowman-Amuah ........................ G06F 9/5038 705/1.1
9,084,020 B2* 7/2015 Park .................. H04N 21/23412
(Continued)

FOREIGN PATENT DOCUMENTS

CN 103188538 A 7/2013
CN 104599669 A 5/2015
(Continued)

OTHER PUBLICATIONS

The State Intellectual Property Office of the People's Republic of China (SIPO) Office Action 1 for 201710804781.3 dated Mar. 8, 2021 9 Pages (including translation).
(Continued)

*Primary Examiner* — Marcus T Riley
(74) *Attorney, Agent, or Firm* — Anova Law Group, PLLC (57) ABSTRACT

A method for controlling a terminal by voice includes: querying, by a first terminal installed with a first client, a second client on a second terminal about scene information. The scene information includes information of at least one operable object in at least one display interface of the second client. The method also includes: displaying, on the first client, a prompt message about voice recording, the prompt message being a reference for a user to issue a voice operation; recording voice to obtain first audio data in response to an operation on a voice recording control of the first client; transmitting the scene information and the first audio data to a server, the server being a back-end server of the second client; and transmitting, after a control instruc-
(Continued)

tion is returned by the server, the control instruction to the second client, the control instruction carrying information of a to-be-performed operable object.

20 Claims, 8 Drawing Sheets

(51) Int. Cl.
 *G10L 15/30* (2013.01)
 *G10L 15/26* (2006.01)
 *H04N 21/422* (2011.01)
(52) U.S. Cl.
 CPC .... *G10L 2015/223* (2013.01); *H04N 21/4222* (2013.01); *H04N 21/42209* (2013.01)

(56) References Cited

U.S. PATENT DOCUMENTS

| | | | |
|---|---|---|---|
| 9,436,650 B2* | 9/2016 | Kim | H04L 67/16 |
| 9,547,650 B2* | 1/2017 | Eyal | H04L 67/10 |
| 9,569,467 B1* | 2/2017 | Schechter | G06F 16/27 |
| 9,691,070 B2* | 6/2017 | Wolf | H04N 21/234336 |
| 9,727,661 B2* | 8/2017 | Kim | H04L 61/1511 |
| 10,127,563 B2* | 11/2018 | Heath | G06Q 50/01 |
| 2003/0058277 A1* | 3/2003 | Bowman-Amuah | G06F 16/289 715/765 |
| 2003/0229900 A1* | 12/2003 | Reisman | H04N 21/42204 725/87 |
| 2011/0274104 A1* | 11/2011 | Cozzi | H04L 67/18 370/352 |
| 2013/0073387 A1* | 3/2013 | Heath | G06Q 30/02 705/14.53 |
| 2013/0073389 A1* | 3/2013 | Heath | G06Q 50/01 705/14.54 |
| 2013/0138728 A1* | 5/2013 | Kim | H04L 12/282 709/203 |
| 2014/0129676 A1* | 5/2014 | Zeng | G06Q 50/01 709/217 |
| 2015/0135206 A1* | 5/2015 | Reisman | H04H 20/93 725/18 |
| 2015/0135214 A1* | 5/2015 | Reisman | H04N 21/4113 725/37 |
| 2015/0370915 A1* | 12/2015 | Kim | G06F 16/986 370/311 |
| 2016/0057175 A1* | 2/2016 | Chen | H04N 7/147 348/14.03 |
| 2017/0061443 A1* | 3/2017 | Wolf | H04N 21/6143 |
| 2017/0072283 A1* | 3/2017 | Davisson | A63B 43/00 |
| 2017/0110128 A1* | 4/2017 | Zhang | G10L 15/22 |
| 2020/0202860 A1* | 6/2020 | Gao | G10L 15/26 |

FOREIGN PATENT DOCUMENTS

| | | |
|---|---|---|
| CN | 104717536 A | 6/2015 |
| CN | 105161106 A | 12/2015 |
| CN | 105957530 A | 9/2016 |
| EP | 2986014 A1 | 2/2016 |

OTHER PUBLICATIONS

The World Intellectual Property Organization (WIPO) International Search Report for PCT/CN2018/104264 dated Nov. 23, 2018 5 Pages (including translation).
The European Patent Office (EPO) The Extended European Search Report for 18853000.0 dated Dec. 9, 2020 15 Pages.
The European Patent Office (EPO) The Partial Supplementary European Search Report for 18853000.0 dated Sep. 8, 2020 16 Pages.
Geza Nemeth et al.: "Speech-enhanced interaction with TV", Cognitive Infocommunications (COGINFOCOM), 2011 2nd International Conference on, IEEE, Jul. 7, 2011 (Jul. 7, 2011), pp. 1-5, XP032044516, ISBN: 978-1-4577-1806-9. 5 pages.

* cited by examiner

METHOD FOR CONTROLLING TERMINAL BY VOICE, TERMINAL, SERVER AND STORAGE MEDIUM

CROSS-REFERENCES TO RELATED APPLICATIONS

The present disclosure is a continuation application of PCT Patent Application No. PCT/CN2018/104264, filed on Sep. 6, 2018, which claims priority to Chinese Patent Application No. 201710804781.3, filed with the Chinese Patent Office on Sep. 8, 2017 and entitled "METHOD FOR CONTROLLING TERMINAL BY VOICE, CLIENT, AND SERVER", the entire contents of both of which are incorporated herein by reference.

FIELD OF TECHNOLOGY

The present disclosure relates to the field of Internet technologies, and in particular, to a method for controlling a terminal by voice, a terminal, a server, and a storage medium.

BACKGROUND OF THE DISCLOSURE

As people's living standards are improved, television equipment (for example, a smart TV or a TV box) is becoming more and more popular in households, and plays an increasingly important role in people's daily leisure and entertainment life. Television equipment refers to a new television product which has an open platform and is equipped with an operation control system and on which application programs can be installed. Therefore, a user can not only enjoy ordinary television content, but also autonomously install and uninstall various types of application software to expand and upgrade functions.

SUMMARY

Embodiments of the present disclosure provide a method for controlling a terminal by voice, a terminal, a server, and a storage medium.

An embodiment of the present disclosure provides a method for controlling a terminal by voice. The method includes: querying, by a first terminal installed with a first client, a second client on a second terminal about scene information. The scene information includes information of at least one operable object in at least one display interface of the second client. The second client is configured to present a media resource based on the at least one operable object. The first terminal is a mobile terminal. The method also includes: displaying, by the first terminal on the first client, a prompt message about voice recording based on the scene information, the prompt message being a reference for a user to issue a voice operation; recording, by the first terminal, voice to obtain first audio data in response to an operation on a voice recording control of the first client on the first terminal; transmitting, by the first terminal, the scene information and the first audio data to a server after the scene information returned by the second client is received, the server being a back-end server of the second client; and transmitting, by the first terminal, after a control instruction is returned by the server, the control instruction to the second client to perform an action corresponding to the first audio data, the control instruction carrying information of a to-be-performed operable object.

An embodiment of the present disclosure provides a method for controlling a terminal by voice. The method is performed by a server and includes: determining a text formed by converting first audio data after scene information and the first audio data that are transmitted by a first client on a first terminal are received, the scene information including at least one piece of operable object information in at least one display interface of a second client on a second terminal; performing word segmentation on the text, to obtain a word segmentation result; forming a control instruction carrying to-be-performed operable object information according to the word segmentation result and the scene information; and transmitting the control instruction to the second client through the first client, so that the second client performs an action corresponding to the control instruction.

An embodiment of the present disclosure provides a first terminal. The first terminal includes: at least one memory; and at least one processor coupled to the at least one memory. The at least one processor is configured to perform: querying, a first client, a second client on a second terminal about scene information. The scene information includes information of at least one operable object in at least one display interface of the second client. The second client is configured to present a media resource based on the at least one operable object. The first terminal is a mobile terminal. The processor is further configured to perform: displaying, on the first client, a prompt message about voice recording based on the scene information, the prompt message being a reference for a user to issue a voice operation; recording voice to obtain first audio data in response to an operation on a voice recording control of the first client on the first terminal; transmitting the scene information and the first audio data to a server after the scene information returned by the second client is received, the server being a back-end server of the second client; and transmitting, after a control instruction is returned by the server, the control instruction to the second client to perform an action corresponding to the first audio data, the control instruction carrying information of a to-be-performed operable object.

An embodiment of the present disclosure provides a non-transitory computer-readable storage medium, storing a computer program, the program, when executed by a processor, implementing steps of the foregoing method.

BRIEF DESCRIPTION OF THE DRAWINGS

To describe the technical solutions in the embodiments of the present disclosure or in the related art more clearly, the following briefly introduces the accompanying drawings required for describing the embodiments or the related art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
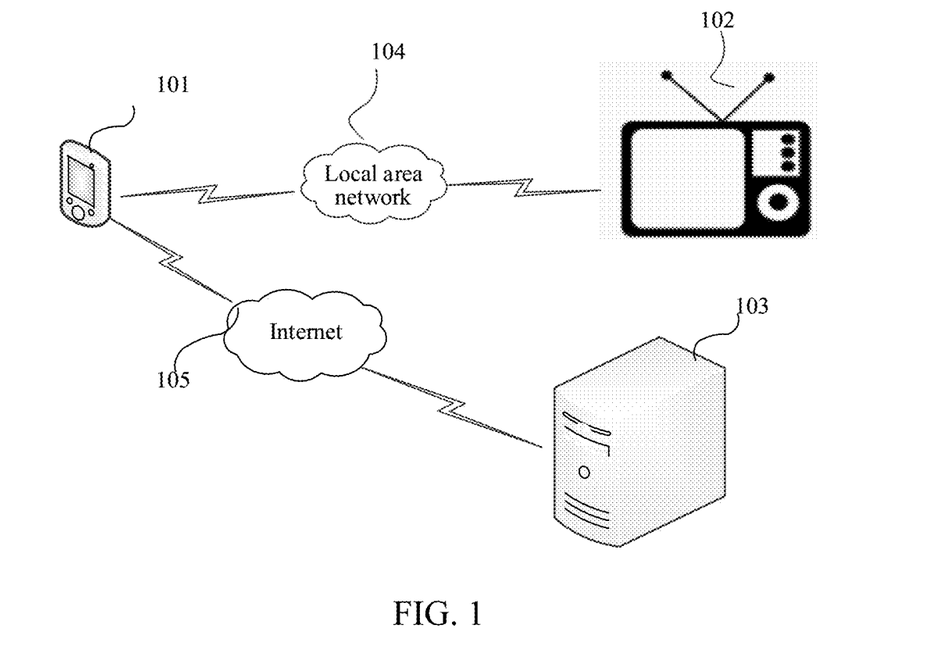
FIG. 1 is a diagram of a system architecture according to an embodiment of the present disclosure.

The present disclosure provides a method for controlling a terminal by voice. A system architecture to which the method is applied is shown in FIG. 1. The system architecture includes: a first terminal 101, a second terminal 102, and a first server 103. The first terminal 101 and the second terminal 102 may be connected through a local area network 104, and the first terminal 101 and the first server 103 may be connected through the Internet 105.

The foregoing first terminal 101 may be a mobile terminal such as a smartphone, a tablet computer, or the like. Clients of various types of application software are installed on the first terminal, and a user can log in to and use the clients, for example, a voice assistant client, of the types of application software through the first terminal.

The foregoing second terminal 102 may be television equipment, for example, a smart TV equipped with Android or another system, and a TV box connected to a conventional TV, where the TV box is equipped with Android or another system and the conventional TV serves as a display of the TV box. Various application programs can be installed on the second terminal, and the user can control these application programs through a remote control. For example, the user can use the remote control to open a Tencent video client installed on the smart TV, find a video that the user wants to watch, and then perform a play, fast forward or fast rewind operation on the video. For another example, the user can use a remote control to open a client of music software (for example, QQ music) installed on the TV box, and then perform a play or collection operation on a local or online song in an interface displayed by the conventional TV.

The foregoing first server 103 refers to a back-end server of the client installed on the second terminal, for example, a back-end server corresponding to a video client on the second terminal, or a back-end server of music software. If a video client is operated on the second terminal, a corresponding first server is a back-end server corresponding to the video client; if a client of music software is operated on the second terminal, a corresponding first server is a back-end server of the music software. In other words, the first server is a back-end server corresponding to a client which is operated on the second terminal. The first server may be specifically a server or a server cluster formed by a plurality of servers.

Figure 2:
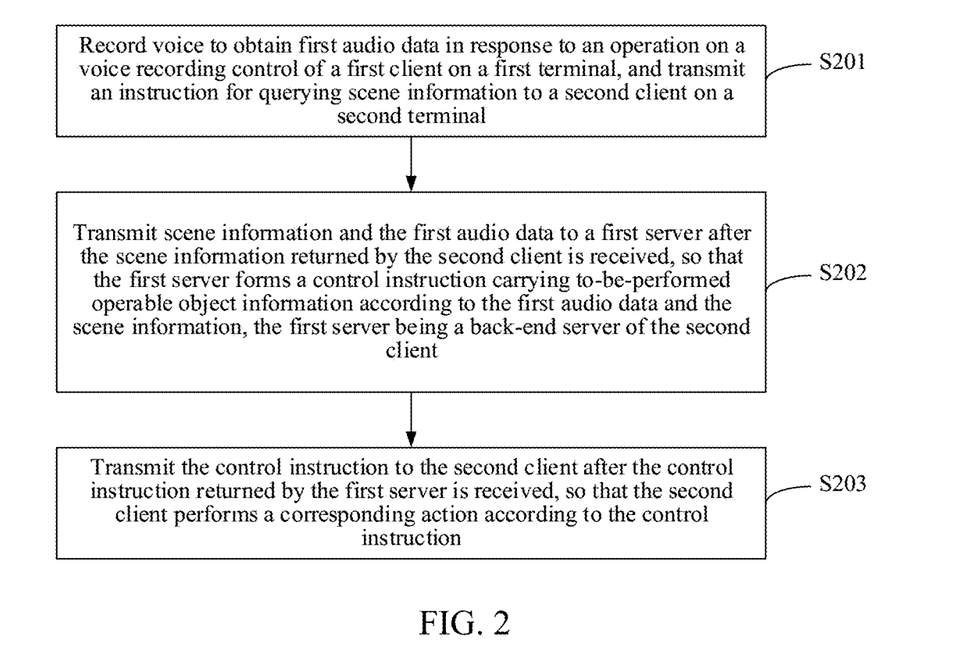
FIG. 2 is a schematic flowchart of a method for controlling a terminal by voice according to an embodiment of the present disclosure.

Based on the system architecture shown in FIG. 1, an embodiment of the present disclosure provides a method for controlling a terminal by voice. The method may be performed by the first terminal 101, and may be specifically performed by the first client on the first terminal 101. As shown in FIG. 2, the method includes:

S201. Record voice to obtain first audio data in response to an operation on a voice recording control of a first client on the first terminal 101, and transmit an instruction for querying scene information to a second client on a second terminal 102, the scene information including at least one piece of operable object information in at least one display interface of the second client.

Figure 3A:
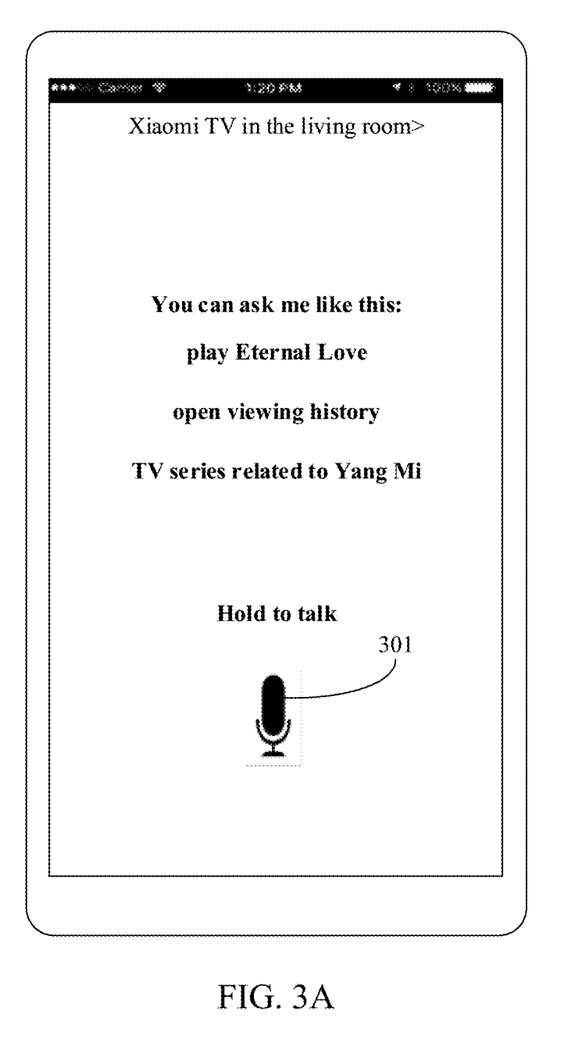
FIG. 3A is a schematic diagram of an interface displayed by a first client according to an embodiment of the present disclosure.
Figure 3B:
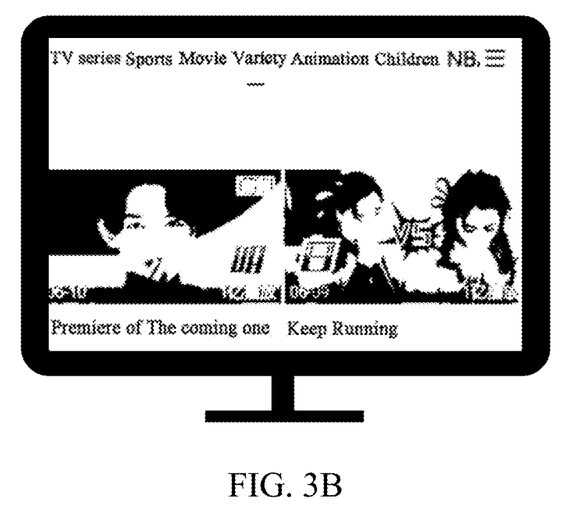
FIG. 3B is a schematic diagram of an interface displayed by a smart TV according to an embodiment of the present disclosure.

It can be understood that, to enable the first client on the first terminal 101 to exchange information with the second terminal 102, the first client on the first terminal 101 needs to be connected to the second terminal 102, and may be specifically connected to the second terminal 102 through a local area network. For example, a client to which a mobile phone interface shown in FIG. 3A belongs is connected to a smart TV shown in FIG. 3B, where the client shown in FIG. 3A is a voice assistant client, and the smart TV shown in FIG. 3B is a Xiaomi TV in the user's living room. In this case, a variety show display interface of a video client is displayed on the smart TV, and information about variety shows, for example, names, posters, and update dates of "The coming one" and "Keep Running", can be seen in this interface. A voice recording control 301 of the first client transmits an instruction for querying scene information to the Xiaomi TV in the living room after being triggered.

The voice recording control 301 may have many forms, for example, a virtual key that is set in an interface. When the user holds the key for a long time, the first client detects surrounding sound and records the detected sound; and when the user releases the key, the recording ends. So far, the recorded sound forms first audio data. Certainly, the voice recording control in some embodiments of the present disclosure can not only record voice, but also transmit an instruction for querying scene information to the second terminal 102 connected to the first client. For example, when the user presses the voice recording control, the first client transmits an instruction for querying scene information to the Xiaomi TV in the living room. Actually, the first audio data recorded by the user through the first client is a voice instruction for operating the second terminal 102. In the display interface of the first client, prompt information for voice recording may be further displayed. For example, as shown in FIG. 3A, the prompt information prompts the user: You can ask me like this: play Eternal Love, open viewing history, or search for a TV series related to Yang Mi, so that the user can issue a voice operation instruction with reference to the prompt information.

The second client is a client installed on the second terminal 102. Since there may be a plurality of clients installed on the second terminal 102, one or more of the clients need to be selected as the second client. In one way, a client corresponding to an interface currently displayed by a television (a conventional TV connected to the TV box or a smart TV) is used as the second client. For example, the Xiaomi TV in the user's living room displays an interface of the Tencent video client, the instruction for querying scene information transmitted by the first client is transmitted to the Tencent video client in the Xiaomi TV, and after receiving the query instruction, the Tencent video client returns scene information of the Tencent video client to the first client.

The so-called scene information includes at least one piece of operable object information in at least one interface of the second client. For example, the Tencent video client includes a variety show display interface, a TV series display interface, a movie display interface, a documentary display interface, and the like. There are many recently hot variety shows in the variety show display interface, and these variety shows are displayed in forms of poster, program name, and the like. Similarly, there are many recently hot TV series in the TV series display interface, and these TV series may also be displayed in forms of poster, TV series name, and the like. Certainly, there are options for viewing history, favorites, search, feedback, settings, and the like, and these options may be used as global options for the Tencent video client. When the user taps a poster of a variety show in the variety show display interface, a play interface of the variety show is displayed. When the user taps the favorites, a favorites interface is displayed, and information about a plurality of videos that the user has added to the favorites is displayed in this interface. Therefore, operable objects of the video client include TV series in the TV series display interface, variety shows in the variety show display interface, and the global options such as viewing history, favorites, search, feedback, and settings. In other words, if the instruction for querying scene information is received by the Tencent video client, the scene information returned by the Tencent video client may include names of a plurality of variety shows, names of a plurality of TV series, names of a plurality of movies, names of a plurality of documentaries, and may further include viewing history, favorites, search, feedback, settings, and the like.

The foregoing scene information is described by using a video client as an example. The second client is not limited to the video client, and may be another client, for example, a music client or a news client. The music client includes a ranking display interface, a playlist display interface, an MV display interface, and a local display interface. There are a plurality of songs ranked by popularity in the ranking display interface, there are a plurality of songs classified by song types in the playlist display interface, there are a plurality of MV songs in the MV display interface, and there are a plurality of songs that have been downloaded locally in the local display interface. Songs displayed in the ranking display interface, the playlist display interface, and the MV display interface are online songs, and songs displayed in the local display interface are local songs. Certainly, global options such as settings, questions and suggestions, and checking for updates may also be included. Operable objects of the music client include online songs, local songs, and global options. In other words, if the instruction for querying scene information is received by the music client, the returned scene information may include names of a plurality of online songs or local songs, and may also include settings, questions and suggestions, checking for updates, and the like.

S202. Transmit the scene information and the first audio data to a first server 103 after the scene information returned by the second client is received, so that the first server 103 forms a control instruction carrying to-be-performed operable object information according to the first audio data and the scene information, the first server 103 being a back-end server of the second client.

The first server 103 is a back-end server of the second client. For example, provided that the second client is a video client, the first server 103 is a server of the video client; provided that the second client is a news client, the first server 103 is a server of the news client.

The so-called to-be-performed operable object information may include names of operable objects. For example, if voice inputted by the user on the first client is "open history", to-be-performed operable object information includes "history", and after receiving a control instruction carrying the to-be-performed operable object information, the second client opens history, that is, displays a history interface, so that the user can see recently watched media content in this interface. For another example, if voice inputted by the user on the first client is "I want to watch Journey to the West", to-be-performed operable object information includes "Journey to the West", and after receiving a control instruction carrying the to-be-performed operable object information, the second client performs an action of playing Journey to the West by default. Certainly, since operations on the second client are not limited to opening and playing, and further include downloading, forwarding, and rewinding, to-be-performed operable object information may further include information such as actions to be performed on the operable objects. For example, if the user inputs voice "download a theme song of Journey to the West" on the first client, the first server 103 generates a control instruction based on the audio data and the scene information of the second client, and to-be-performed operable object information in the control instruction includes not only "a theme song of Journey to the West", but also "download", so that after receiving the control instruction, the second client does not perform an action of playing the theme song of Journey to the West, but performs an action of downloading the theme song of Journey to the West.

Herein, a process in which the first server 103 forms a control instruction according to the scene information and the first audio data may be implemented in many ways, which is not limited in this embodiment of the present disclosure.

S203. Transmit, to the second client, the control instruction returned by the first server 103 after the control instruction is received, so that the second client performs a corresponding action according to the control instruction.

For example, provided that a smart TV connected to the first client of the user's first terminal 101 displays an interface of a video client, when the user holds the voice recording control on the first client and says "I want to watch Journey to the West", the first client transmits an instruction for querying scene information to the second client on the second terminal 102. In this case, the video client displayed by the smart TV returns the scene information including names of various TV series, movies and variety shows, and some global options to the first client. After receiving the scene information, the first client transmits the scene information and the audio data of "I want to watch Journey to the West" to the back-end server of the video client, that is, the first server 103. After receiving the scene information and the audio data, the first server 103 learns, according to the audio data, that the user wants to watch Journey to the West, combines the audio data and the scene information to generate a control instruction, and then returns the control instruction to the first client. The first client then transmits the control instruction to the second client, so that the second client performs an action of opening a play interface of a media resource of "Journey to the West". Certainly, if there is more than one media resource related to "Journey to the West", for example, media resources related to "Journey to the West" found by the second client according to the control instruction include a TV series "Journey to the West", a TV series "New Journey to the West", a cartoon "Journey to the West", movies "Journey to the West: Havoc in Heaven" and "Journey to the West: Return of the Great Sage", and the like, and there are many episodes of TV series related to Journey to the West, the second client may display information about these media resources on the smart TV or a conventional TV connected to the TV box for the user to choose. After the user selects one of the media resources by voice or using a remote control, an action of playing is performed. The second client may further give the user some corresponding prompts about whether a corresponding action is performed successfully or not.

It can be learned from the above description that, in the method for controlling a terminal by voice provided in some embodiments of the present disclosure, the user triggers the voice recording control of the first client, so that the first client records voice and transmits the instruction for querying scene information to the second client of the second terminal 102. After receiving the scene information returned by the second client, the first client transmits the scene information and audio data inputted by the user to the back-end server of the second client. The server forms a control instruction according to received information, and then transmits the instruction to the second client through the first client, so that the second client performs a corresponding action. In the whole process, the user only needs to input voice through the first client of the first terminal 101, to control the second terminal 102 to perform a corresponding action. For example, television equipment is used as the second terminal 102, the user does not need to use a remote control to perform operations step by step, that is, tedious operations of the remote control are omitted, thereby making it greatly convenient for the user to operate the second terminal 102.

In some embodiments, an agent module may be installed on the second terminal 102, for example, a TV agent module may be installed on the smart TV or the TV box. The so-called TV agent module is actually an application program that is invisible to the user, and may serve as a bridge for other application programs installed on the smart TV or the TV box to interact with the outside world. In other words, other application programs installed on the smart TV or the TV box interact with the outside world through the agent module, which facilitates the management of the interaction between the application programs in the smart TV or the TV box and the outside world. In practical applications, application programs (for example, a video client, a music client, a news client, and the like) that can participate in voice control in the second terminal 102 may be registered in the agent module first, and if an application program is not registered in the agent module, the application program cannot participate in voice control, that is, the user cannot control the application program to perform actions through voice. After receiving an instruction transmitted from the outside, the agent module transmits the instruction to a corresponding application program through broadcast, for example, specify a package name when broadcasting, and only transmits the instruction to a foreground application program, so that only the foreground application program can receive the instruction. The so-called foreground application program is a client to which a current display interface of the second terminal 102 belongs.

On the basis of setting the agent module in the second terminal 102, in S201, the process in which the first client transmits an instruction for querying scene information to the second client on the second terminal 102 may be: the first client transmits the instruction for querying scene information to the agent module in the second terminal 102, so that the agent module transmits the instruction for querying scene information to the second client. In other words, after the user triggers the voice recording control of the first client, the first client transmits an instruction for querying scene information to the agent module in the second terminal 102, and after receiving the instruction for querying scene information, the agent module transmits the instruction for querying scene information to the second client. Certainly, after receiving the instruction for querying scene information transmitted by the agent module, the second client returns scene information to the agent module, and after receiving the scene information, the agent module transmits the scene information to the first client. Similarly, in step S203, the process in which the first client transmits the control instruction to the second client may be: the control instruction is transmitted to the agent module in the second terminal 102, so that the agent module transmits the control instruction to the second client. In other words, after receiving the control instruction transmitted by the first server 103, the first client transmits the control instruction to the agent module, and after receiving the control instruction, the agent module transmits the control instruction to the second client. It can be learned that, the client in the second terminal 102 and the external first terminal 101 interact with each other through the agent module, to implement the management of communication between the client in the second terminal 102 and the outside.

In addition, the agent module in the second terminal 102 may be further configured to display some prompt information in the TV interface. For example, when the user inputs voice on the first client, the first client transmits an instruction for querying scene information to the agent module, and after receiving the instruction, the agent module learns that the user is recording voice, so that the agent module can display, in a current interface of the TV, prompt information that voice is being inputted.

In some embodiments, in step S202, there are many ways of transmitting the scene information and the first audio data to the first server 103. In one way, the first audio data is transmitted to the first server 103 slice by slice in a streaming slice transmitting mode, to improve transmission efficiency. For example, each slice is transmitted in 300 ms. In other words, the first audio data is divided into a plurality of slices, and these slices are transmitted to the first server 103 slice by slice. The scene information may be carried in any one of the slices. For example, the scene information is carried in a last slice. After a slice carrying the scene information is received by the first server 103, it can be considered that reception of the first audio data is completed. Certainly, the first audio data and the scene information may be transmitted to the first server 103 in other ways.

Figure 4:
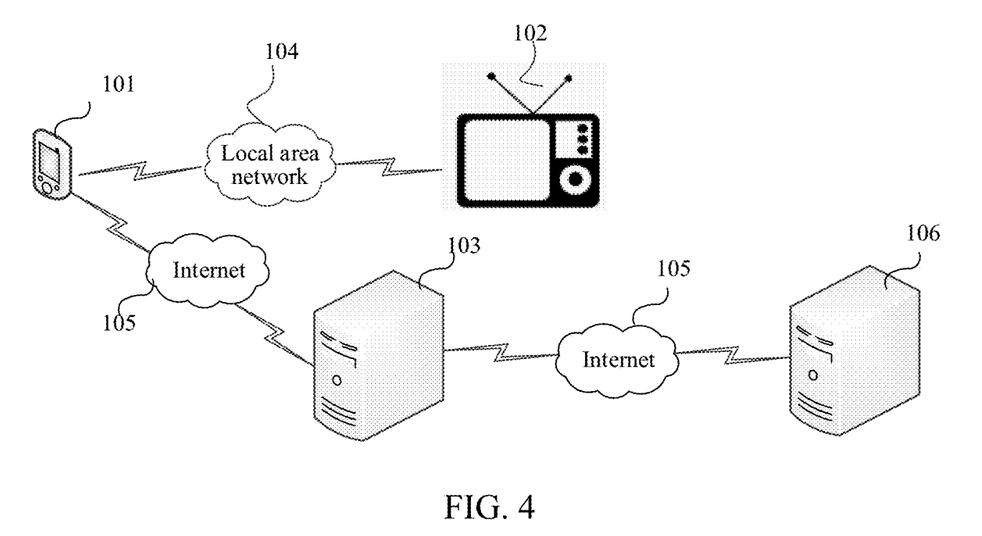
FIG. 4 is a diagram of a system architecture according to an embodiment of the present disclosure.

In some embodiments, there are many ways in which the first server 103 forms the control instruction after the first client transmits the scene information and the first audio data to the first server 103. For example, the first server 103 converts the first audio data into a text, performs word segmentation on the text, performs matching between a word segmentation result and the scene information, and forms a control instruction according to a matching result. Certainly, the first server 103 may also transmit the first audio data to another server having an audio recognition capability, for example, a back-end server of WeChat or a back-end server of QQ (WeChat and QQ are both instant messaging applications that have embedded voice to text conversion functionalities implemented in accordance with their back-end server). The another server having the audio recognition capability is referred to as a second server 106. In this case, as shown in FIG. 4, the second server 106 is added to the system architecture to which the embodiments of the present disclosure are applied. Referring to FIG. 4, the first server 103 and the second server 106 may be separately disposed, and in this case, the first server 103 and the second server 106 transmit data to each other through a network. Certainly, the first server 103 and the second server 106 may be integrated to obtain an integrated server, and in this case, the integrated server has both the functions of the first server 103 and the functions of the second server 106. After receiving the first audio data, the second server 106 converts the first audio data into a text, and then returns the text to the first server 103, so that the first server 103 performs word segmentation on the received text, performs matching between a word segmentation result and the scene information, and forms a control instruction according to a matching result. In other words, the first server 103 having no voice processing capability may transmit the first audio data to the second server 106 having the voice processing capability, so that the second server 106 converts the first audio data into a text and then returns the text to the first server 103. For example, provided that a current display interface of the TV is an interface of a video client, when the user holds the voice recording control of the first client to input voice "I want to watch Journey to the West", the first client transmits, to the first server 103, the voice and the scene information returned by the video client. However, the first server 103 has no capability of converting the voice inputted by the user into a text, so that after receiving the voice and the scene information, the first server 103 transmits the voice to the back-end server of WeChat, that is, the second server 106. The back-end server of WeChat converts the voice into a text, and returns the text to the first server 103. After receiving the text, the first server 103 performs word segmentation on the text "I want to watch Journey to the West" by using a semantic-based word segmentation method, to obtain a word segmentation result: "I", "want to watch", and "Journey to the West", then performs matching between the word segmentation result and the scene information, and finds that there are videos related to Journey to the West in the scene information, so that the first server 103 forms a control instruction carrying information about videos related to "Journey to the West".

Certainly, the first server 103 may further convert the text into standard voice, which may be referred to as second audio data, and then transmit the second audio data to the first client. The first server 103 may also transmit a speech synthesis request to the second server 106, and after receiving the request, the second server 106 converts the text into standard voice, that is, second audio data, and then returns the second audio data to the first server 103, so that the first server 103 can transmit the second audio data to the first client. The second server 106 refers to a server having the voice processing capability. The so-called voice processing capability includes converting audio data into a text, and certainly may further include converting a text into standard audio data. In this method in which the first server 103 transmits the speech synthesis request to the second server 106 having the voice processing capability to obtain the second audio data, the requirements for the first server 103 are not high, and the first server 103 is not required to have the voice processing capability. Therefore, a first server 103 having the voice processing capability can convert the text into the second audio data, and a first server 103 having no voice processing capability can transmit the speech synthesis request to the second server 106 having the voice processing capability to obtain the second audio data.

When receiving the second audio data transmitted by the first server 103, the first client may play the second audio data, or may transmit the second audio data to the second terminal 102, for example, transmit the second audio data to the agent module in the second terminal 102, so that the agent module plays the second audio data. The second audio data is audio data formed by converting a text, and the text is formed by converting the first audio data. In this way, the user can hear the standard voice corresponding to the voice the user has inputted.

Figure 5:
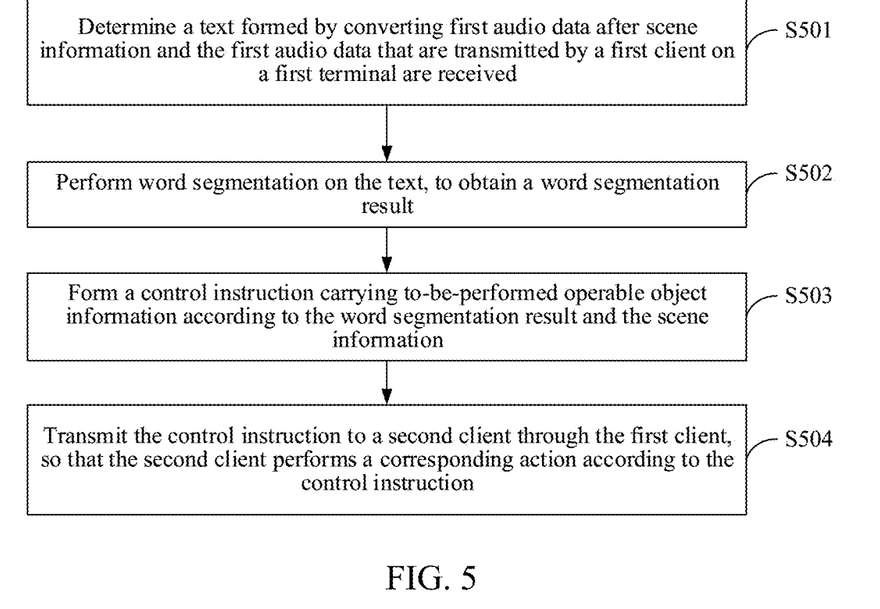
FIG. 5 is a schematic flowchart of a method for controlling a terminal by voice according to an embodiment of the present disclosure.

Based on the system architecture shown in FIG. 4, an embodiment of the present disclosure further provides a method for controlling a terminal by voice, and the method may be performed by the first server 103. As shown in FIG. 5, the method includes the following steps:

S501: Determine a text formed by converting first audio data after scene information and the first audio data that are transmitted by a first client on a first terminal 101 are received, the scene information including at least one piece of operable object information in at least one display interface of a second client on a second terminal 102.

It can be understood that, in step S501, a way in which the first server 103 determines a text formed by converting the first audio data may be: the first server 103 converts the first audio data into a text; or, the first server 103 transmits the first audio data to the second server 106 after receiving the scene information and the first audio data that are transmitted by the first client, so that the second server 106 converts the first audio data into a text, and returns the text to the first server 103, that is, the first server 103 transmits the first audio data to the second server 106 having the voice processing capability. Any of the two ways may be used, as long as the first server 103 can obtain the text formed by converting the first audio data.

S502: Perform word segmentation on the text, to obtain a word segmentation result.

For example, the word segmentation result obtained after performing word segmentation on the text "I want to watch Journey to the West" is "I", "want to watch", and "Journey to the West". The word segmentation method here may be, but is not limited to, a word segmentation method based on semantic analysis.

S503: Form a control instruction carrying to-be-performed operable object information according to the word segmentation result and the scene information.

S504: Transmit the control instruction to a second client through the first client, so that the second client performs a corresponding action according to the control instruction.

In the method for controlling a terminal by voice provided in some embodiments of the present disclosure, after receiving the scene information and the first audio data that are transmitted by the first client, the first server 103 first obtains a text corresponding to the first audio data, then performs word segmentation on the text, then forms a control instruction based on the word segmentation result and the scene information, and transmits the control instruction to the first client, and the first client transmits the control instruction to the second client, so that the second client performs a corresponding action, thereby controlling the second client by voice.

It can be understood that, for the explanation, examples, and beneficial effects of the content in the method for controlling a terminal by voice performed by the first server and provided in the embodiments of the present disclosure, reference may be made to the corresponding content in the method for controlling a terminal by voice performed by the first client in the previous embodiment, and this will not be described herein again.

In some embodiments, there are many ways of forming a control instruction in the foregoing S503, one of which is:

performing matching between the word segmentation result and the scene information, and forming the control instruction carrying to-be-performed operable object information in a case that the scene information has operable object information that matches the word segmentation result, the to-be-performed operable object information being operable object information that matches the word segmentation result.

For example, if the word segmentation result is "I", "want to watch", and "Journey to the West", and the scene information includes a video name "Journey to the West", it is considered that in the scene information, there is operable object information that matches the word segmentation result, and a formed control instruction carries the video name "Journey to the West". In this way, after receiving the control instruction, the second client performs an action of playing the operable object, that is, a video "Journey to the West".

It can be understood that, the operable object information included in the scene information may be operable object information that corresponds to a media resource stored in the first server 103, or may be operable object information of a third-party media resource. The so-called media resource may be video, music, news content (including text, pictures, and the like), or another type of media resource.

Certainly, since the display interface of the second client mostly displays content played recently, and content played a long time ago may not be displayed, there is no corresponding operable object information in the scene information. However, related media resources are stored in the back-end server of the second client, that is, the first server 103. Since this case may exist, the process of forming a control instruction in step S503 may include:

performing matching between the word segmentation result and the scene information, and search for a media resource that matches the word segmentation result according to the word segmentation result in a case that the scene information has no operable object information that matches the word segmentation result; and forming the control instruction carrying to-be-performed operable object information in a case that the media resource that matches the word segmentation result is found, the to-be-performed operable object information being operable object information that corresponds to the media resource that matches the word segmentation result.

The foregoing search for a media resource is to search for a media resource in the first server 103. If a media resource that matches the word segmentation result is stored in the first server 103, for example, if there is no operable object information that matches "Journey to the West" in the scene information, a media resource is searched for in the first server 103. If a video resource that matches "Journey to the West" is found, a control instruction is formed, and the control instruction includes the video name "Journey to the West". After receiving the control instruction, the second client performs an action of playing the operable object, that is, a video "Journey to the West". In other words, the smart TV or the TV connected to the TV box enters a play interface of Journey to the West.

Figure 6A:
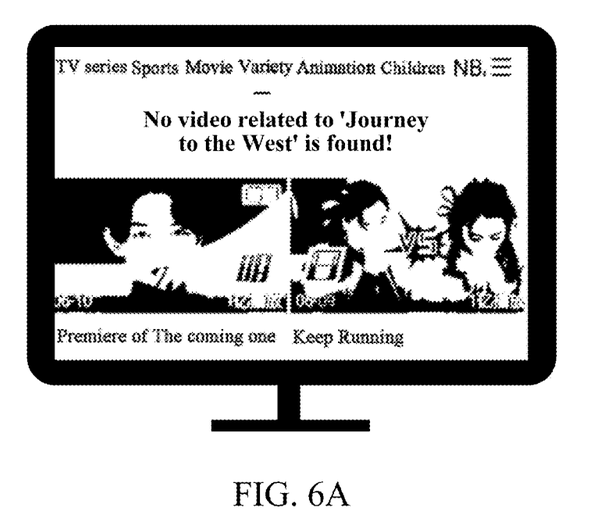
FIG. 6A is a schematic diagram of an interface displayed by a smart TV according to an embodiment of the present disclosure.

Certainly, there may be a case in which the media resource that matches the word segmentation result is not found. In this case, the first server 103 may feed back a search result to the second client through the first client, so that the second client displays the search result. For example, the first server 103 feeds back a search result that no video related to Journey to the West is found to the first client, and after receiving information, the first client transmits the information to the second client. As shown in FIG. 6A, the second client then displays prompt information that "no video related to 'Journey to the West' is found!" on the TV.

Figure 6B:
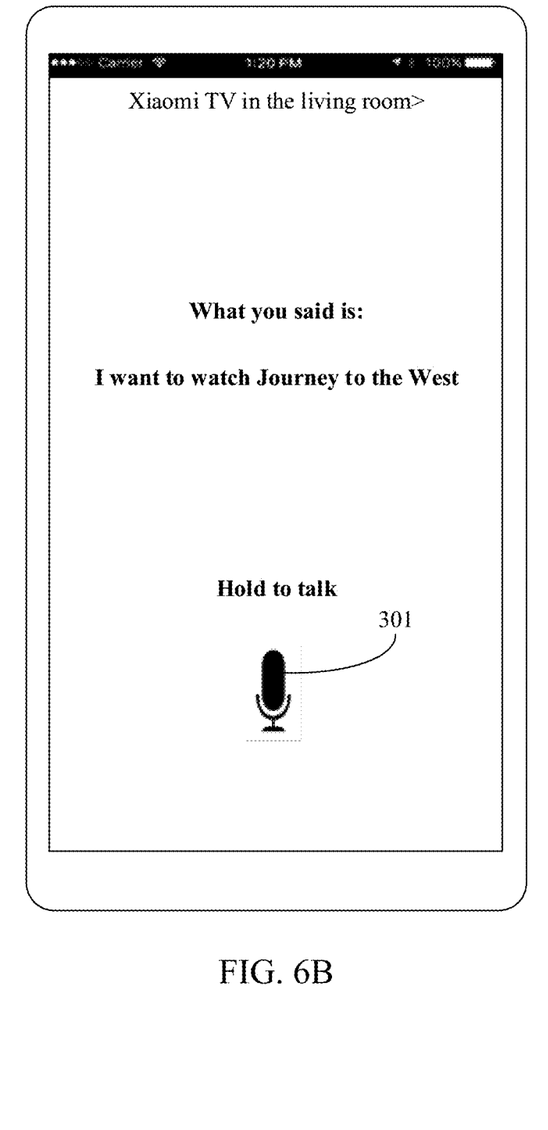
FIG. 6B is a schematic diagram of an interface displayed by a first client according to an embodiment of the present disclosure.

After obtaining the text of the first audio data, the first server 103 may further transmit the text to the first client, so that the first client can display the text, as shown in FIG. 6B, display "What you said is: I want to watch Journey to the West".

In some embodiments, the first client may transmit the first audio data to the first server 103 in the streaming slice transmitting mode. If the first server 103 has no voice processing capability, the first server 103 transmits the first audio data to the second server 106. Specifically, after receiving each slice of the first audio data, the first server 103 transmits the slice to the second server 106, so that the second server 106 converts the slice into a corresponding text fragment, and returns the text fragment to the first server 103. Text fragments corresponding to slices are combined into a text. In such a way in which the slices are transmitted to the second server 106 in the streaming slice transmitting mode so that the second server 106 performs the text conversion, transmission efficiency can be improved.

In some embodiments, the first server 103 may obtain standard voice corresponding to the text. If the first server 103 has no voice processing capability, the first server 103 may transmit a speech synthesis request to the second server 106 so that the second server 106 converts the text into second audio data; and transmit the second audio data to the first client after receiving the second audio data returned by the second server 106.

After the second audio data is transmitted to the first client, the first client may play the second audio data, or may transmit the second audio data to the second terminal 102 so that the second terminal 102 plays the second audio data.

An embodiment of the present disclosure further provides a first terminal 700. The first terminal includes:

at least one memory; and at least one processor, the at least one memory storing at least one instruction module configured to be executed by the at least one processor.

Figure 7:
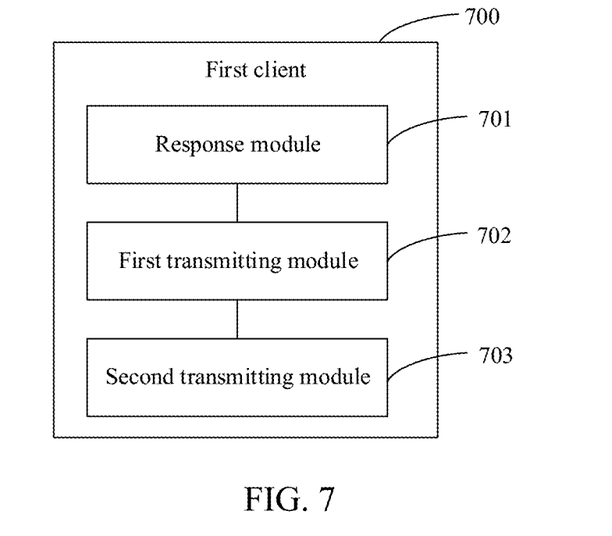
FIG. 7 is a structural block diagram of a first client according to an embodiment of the present disclosure.

Since the foregoing method performed by the first terminal is actually performed by the first client installed on the first terminal, the at least one instruction module is an instruction module in the first client. As shown in FIG. 7, the at least one instruction module includes:

a response module 701, configured to record voice to obtain first audio data in response to an operation on a voice recording control of a first client on the first terminal, and transmit an instruction for querying scene information to a second client on a second terminal, the scene information including at least one piece of operable object information in at least one display interface of the second client;

a first transmitting module 702, configured to transmit the scene information and the first audio data to a first server after the scene information returned by the second client is received, so that the first server forms a control instruction carrying to-be-performed operable object information according to the first audio data and the scene information, the first server being a back-end server of the second client; and a second transmitting module 703, configured to transmit, to the second client, a control instruction returned by the first server after the control instruction is received, so that the second client performs a corresponding action according to the control instruction.

In some embodiments, the first transmitting module 702 may transmit the first audio data to the first server slice by slice in a streaming slice transmitting mode, the scene information being carried in one slice of the first audio data, for example, the scene information being carried in a last slice of the first audio data.

In some embodiments, the first client may further include:

a playing module, configured to play second audio data after the second audio data transmitted by the first server is received, the second audio data being formed by converting a text, and the text being formed by converting the first audio data.

In some embodiments, the second transmitting module 703 may be further configured to transmit second audio data to an agent module of the second terminal after the second audio data transmitted by the first server is received, so that the agent module plays the second audio data, the second audio data being formed by converting a text, and the text being formed by converting the first audio data.

In some embodiments, the response module 701 may be configured to transmit the instruction for querying scene information to an agent module in the second terminal, so that the agent module transmits the instruction for querying scene information to the second client.

In some embodiments, the second transmitting module 703 may be configured to transmit the control instruction to an agent module in the second terminal, so that the agent module transmits the control instruction to the second client.

It can be understood that, the first client provided in some embodiments of the present disclosure is a functional architecture module in the foregoing method for controlling a terminal by voice, and for the explanation, examples, and beneficial effects of the content related to the first client, reference may be made to the related content in the foregoing method for controlling a terminal by voice, and this is not described herein again.

Figure 8:
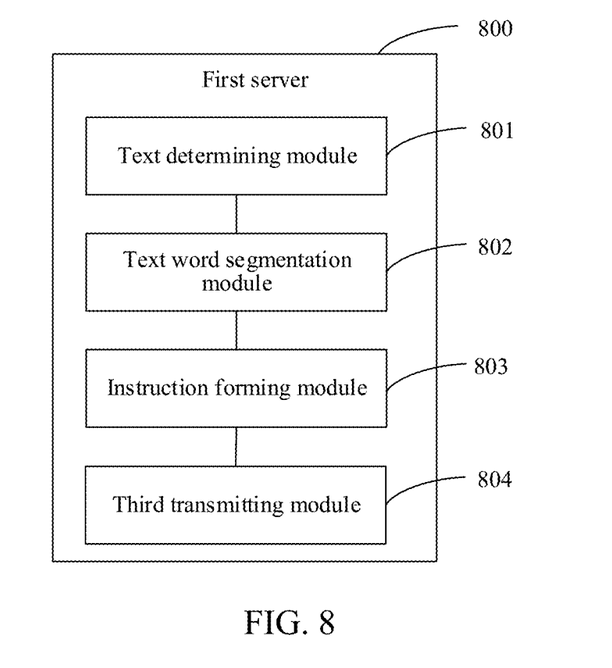
FIG. 8 is a structural block diagram of a first server according to an embodiment of the present disclosure.

An embodiment of the present disclosure further provides a first server 800. The server includes:

at least one memory; and at least one processor;

the at least one memory storing at least one instruction module configured to be executed by the at least one processor. As shown in FIG. 8, the at least one instruction module includes:

a text determining module 801, configured to determine a text formed by converting first audio data after scene information and the first audio data that are transmitted by a first client on a first terminal are received, the scene information including at least one piece of operable object information in at least one display interface of a second client on a second terminal;

a text word segmentation module 802, configured to perform word segmentation on the text, to obtain a word segmentation result;

an instruction forming module 803, configured to form a control instruction carrying to-be-performed operable object information according to the word segmentation result and the scene information; and a third transmitting module 804, configured to transmit the control instruction to the second client through the first client, so that the second client performs a corresponding action according to the control instruction.

In some embodiments, the instruction forming module 803 may be configured to perform matching between the word segmentation result and the scene information, and form a control instruction carrying to-be-performed operable object information in a case that the scene information has operable object information that matches the word segmentation result, the to-be-performed operable object information being operable object information that matches the word segmentation result.

In some embodiments, the instruction forming module 803 may be configured to perform matching between the word segmentation result and the scene information, and search for a media resource that matches the word segmentation result according to the word segmentation result in a case that the scene information has no operable object information that matches the word segmentation result; and form the control instruction carrying to-be-performed operable object information in a case that the media resource that matches the word segmentation result is found, the to-be-performed operable object information being operable object information that corresponds to the media resource that matches the word segmentation result.

In some embodiments, the instruction forming module 803 may be further configured to feed back a search result to the second client through the first client in a case that the media resource that matches the word segmentation result is not found, so that the second client displays the search result.

In some embodiments, the text determining module 801 may be configured to transmit the first audio data to a second server after the scene information and the first audio data that are transmitted by the first client are received, so that the second server converts the first audio data into a text and returns the text to the first server.

In some embodiments, the text determining module 801 may be specifically configured to transmit each slice of the first audio data to the second server after the slice is received, so that the second server converts the slice into a corresponding text fragment, and returns the text fragment to the first server; text fragments corresponding to slices being combined into a text.

In some embodiments, the first server 800 may further include:

a request module, configured to transmit a speech synthesis request to the second server so that the second server converts the text into second audio data; and transmit the second audio data to the first client after receiving the second audio data returned by the second server.

In some embodiments, the third transmitting module 804 may be further configured to transmit the text to the first client, so that the first client displays the text.

It can be understood that, the first server provided in some embodiments of the present disclosure is a functional architecture module in the foregoing method for controlling a terminal by voice, and for the explanation, examples, and beneficial effects of the content related to the first client, reference may be made to the related content in the foregoing method for controlling a terminal by voice, and this is not described herein again.

Figure 9:
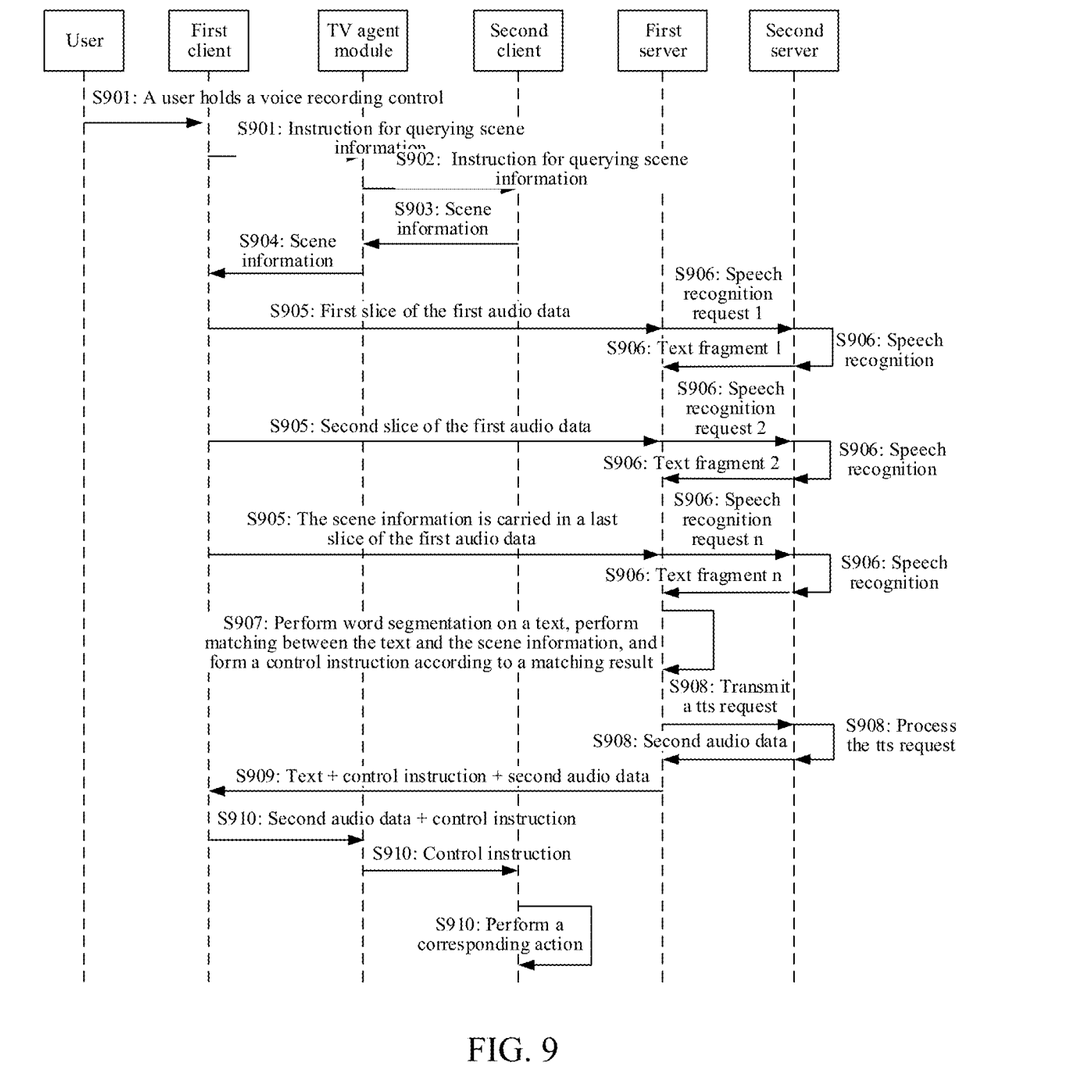
FIG. 9 is a schematic diagram of an overall interaction of a method for controlling a terminal by voice according to an embodiment of the present disclosure.

On the basis of the first client on the first terminal and the first server, and with reference to FIG. 9, an embodiment of the present disclosure further provides an overall process of a method for controlling a terminal by voice.

S901: Start recording voice when a user holds a voice recording control on a first client, and the first client transmits an instruction for querying scene information to a TV agent module.

S902: After receiving the instruction for querying scene information, the TV agent module transmits the instruction for querying scene information to a second client.

S903: After receiving the instruction for querying scene information, the second client returns scene information to the TV agent module.

S904: After receiving the scene information, the TV agent module transmits the scene information to the first client.

S905: The first client transmits the recorded first audio data to a first server slice by slice in a streaming slice transmitting mode, the scene information being carried in a last slice.

S906: After receiving a voice slice, the first server transmits a speech recognition request to a second server, to obtain a text fragment of the voice slice.

S907: After the recognition is completed, the first server performs word segmentation on a text composed of text fragments, performs matching between a word segmentation result and the scene information, and forms a control instruction according to a matching result.

S908: The first server transmits a tts request, that is, a speech synthesis request, to the second server, and the second server processes the tts request, converts the text into second audio data, and returns the second audio data to the first server.

S909: The first server transmits the text, the control instruction, and the second audio data to the first client.

S910: The first client displays the received text in the interface, and plays the second audio data or transmits the second audio data to the TV agent module so that the TV agent module plays the second audio data. The first client transmits the received control instruction to the TV agent module, and the TV agent module transmits the control instruction to the second client, so that the second client performs a corresponding action, so as to complete the process of controlling the second client by voice. In the foregoing process, the user only needs to input voice through the voice recording control, and tedious operations of the remote control are omitted, thereby providing great convenience for the user.

It can be understood that, since the first client is installed on the first terminal, an actual hardware execution body of the method performed by the first client is the first terminal.

An embodiment of the present disclosure further provides a non-volatile computer-readable storage medium, storing a computer program, and the program, when executed by a processor, implementing the steps of any one of the foregoing methods.

Figure 10:
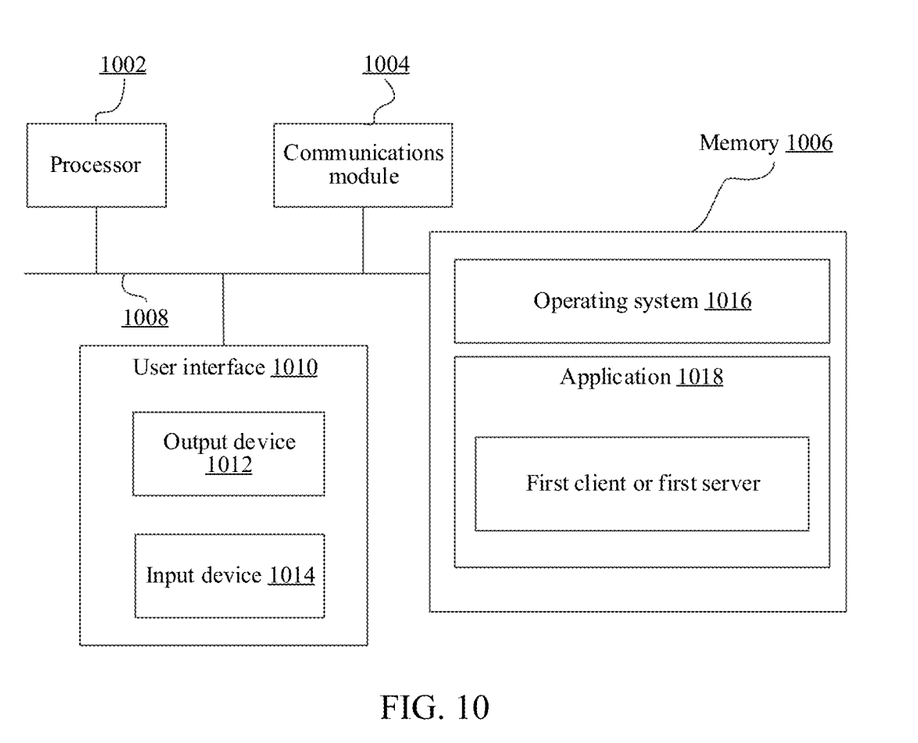
FIG. 10 is a structural block diagram of a computer device according to an embodiment of the present disclosure.

An embodiment of the present disclosure further provides a computer device. FIG. 10 is a structural diagram of composition of a computer device where a first client or a first server is located. As shown in FIG. 10, the computer device includes one or more processors (CPU) 1002, a communications module 1004, a memory 1006, a user interface 1010, and a communications bus 1008 configured to interconnect these components.

The processor 1002 may receive and transmit data by using the communications module 1004, to implement network communication and/or local communication.

The user interface 1010 includes one or more output devices 1012, including one or more speakers and/or one or more visualization displays. The user interface 1010 further includes one or more input devices 1014, including a keyboard, a mouse, a sound command input unit or a microphone, a touch display, a touch-sensitive input panel, a posture capturing camera, another input key or control, or the like.

The memory 1006 may be a high-speed random access memory such as a DRAM, an SRAM, a DDR RAM, or other random access solid-state memory devices; or a non-volatile memory such as one or more magnetic disk storage devices, optical disc storage devices, flash memory devices, or other non-volatile solid-state memory devices.

The memory 1006 stores an instruction set that can be executed by the processor 1002 and includes:

an operating system 1016, including a program used for processing various basic system services and for executing hardware-related tasks; and an application 1018, including various application programs used for controlling a terminal by voice, where such application programs can implement processing procedures in the foregoing examples, and for example, may include some or all of units or modules in the first client or the first server. At least one module of the first client or the first server may store a machine-executable instruction. The processor 1002 executes a machine-executable instruction of at least one of the units in the memory 1006, to implement a function of at least one module in the foregoing modules.

Not all steps and modules in the procedures and the structural diagrams are necessary, and some steps or modules may be omitted according to an actual need. An execution sequence of the steps is not fixed and may be adjusted as needed. Division of the modules is merely functional division for ease of descriptions. During actual implementation, one module may include a plurality of modules, and functions of a plurality of modules may be implemented by a same module. These modules may be located in a same device or in different devices.

Hardware modules in the embodiments may be implemented by hardware or a hardware platform combined with software. The software includes machine-readable instructions, stored in a non-volatile storage medium. Therefore, the embodiments may alternatively be reflected as software products.

In the embodiments, the hardware may be implemented by dedicated hardware or hardware executing the machine-readable instructions. For example, the hardware may be a permanent circuit or logical device (for example, a special-purpose processor, such as an FPGA or an ASIC) that is specially designed to perform particular operations. Alternatively, the hardware may include a programmable logic device or circuit (for example, including a general-purpose processor or another programmable processor) that is temporarily configured by software to perform particular operations.

In addition, each embodiment of the present disclosure may be implemented by a data processing program executed by a data processing device such as a computer. Apparently, the data processing program constitutes the present disclosure. In addition, generally, a data processing program stored in a storage medium is directly read from the storage medium for execution or the program is installed on or replicated to a storage device (such as a hard disk or an internal memory) of a data processing device for execution. Therefore, such storage medium also constitutes the present disclosure. The present disclosure further provides a non-volatile storage medium storing a data processing program. The data processing program may be used for performing any one of the foregoing embodiments of the present disclosure.

The machine-readable instructions corresponding to the modules in FIG. 10 can enable the operating system and the like running on the computer to complete some or all operations described herein. A non-volatile computer-readable storage medium may be a memory disposed in an extension board inserted into the computer or a memory disposed in an extension unit connected to the computer. A CPU and the like installed on the extension board or the extension unit can perform some or all actual operations according to the instructions.

The foregoing descriptions are merely some embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for controlling a terminal by voice, comprising:
    querying, by a first terminal installed with a first client, a second client on a second terminal about scene information, the scene information comprising information of at least one operable object in at least one display interface of the second client, the second client being configured to present a media resource based on the at least one operable object, and the first terminal being a mobile terminal;
    displaying, by the first terminal on the first client, a prompt message about voice recording based on the scene information, the prompt message being a reference for a user to issue a voice operation;
    recording, by the first terminal, voice to obtain first audio data in response to an operation on a voice recording control of the first client on the first terminal;
    transmitting, by the first terminal, the scene information and the first audio data to a server after the scene information returned by the second client is received, the server being a back-end server of the second client; and
    transmitting, by the first terminal, after a control instruction is returned by the server, the control instruction to the second client to perform an action corresponding to the first audio data, the control instruction carrying information of a to-be-performed operable object.

2. The method according to claim 1, wherein the transmitting the scene information and the first audio data to the server comprises:
    transmitting the first audio data to the server, slice by slice in a streaming slice transmitting mode, the scene information being carried in one slice of the first audio data.

3. The method according to claim 2, wherein the scene information is carried in a last slice of the first audio data.

4. The method according to claim 1, further comprising:
    receiving second audio data transmitted by the server, the second audio data being formed by converting a text, the text being formed by converting the first audio data; and
    playing the second audio data.

5. The method according to claim 1, further comprising:
    receiving second audio data from the server, the second audio data being formed by converting a text, the text being formed by converting the first audio data; and
    transmitting the second audio data to an agent application of the second terminal to be played by the agent application.

6. The method according to claim 5, wherein querying a second client on a second terminal about scene information comprises:
    querying an agent application of the second terminal about the scene information, the agent application being configured to query the second client about the scene information.

7. The method according to claim 1, further comprising:
    receiving from the server and forwarding to the second client a search result when the server does not find a media resource that matches a text converted from the first audio data, the second client being configured to display the search result.

8. A first terminal, comprising:
    at least one memory; and
    at least one processor coupled to the at least one memory and configured to perform:
    querying, using a first client installed on the first terminal, a second client on a second terminal about scene information, the scene information comprising information of at least one operable object in at least one display interface of the second client, the second client being configured to present a media resource based on the at least one operable object, the first terminal being a mobile terminal;
    displaying, on the first client, a prompt message about voice recording based on the scene information, the prompt message being a reference for a user to issue a voice operation;
    recording voice to obtain first audio data in response to an operation on a voice recording control of the first client on the first terminal;
    transmitting the scene information and the first audio data to a server after the scene information returned by the second client is received, the server being a back-end server of the second client; and
    transmitting after a control instruction is returned by the server, the control instruction to the second client to perform an action corresponding to the first audio data, the control instruction carrying information of a to-be-performed operable object.

9. The terminal according to claim 8, wherein the transmitting the scene information and the first audio data to the server comprises:
    transmitting the first audio data to the server, slice by slice in a streaming slice transmission mode, the scene information being carried in one slice of the first audio data.

10. The terminal to claim 9, wherein the scene information is carried in a last slice of the first audio data.

11. The terminal according to claim 8, wherein the at least one processor is further configured to perform:
    receiving second audio data transmitted by the server, the second audio data being formed by converting a text, the text being formed by converting the first audio data; and
    playing the second audio data.

12. The terminal according to claim 8, wherein the at least one processor is further configured to perform:
    receiving second audio data from the server, the second audio data being formed by converting a text, the text being formed by converting the first audio data; and
    transmitting the second audio data to an agent application of the second terminal to be played by the agent application.

13. The terminal according to claim 12, wherein querying a second client on a second terminal about scene information comprises:

querying an agent application of the second terminal about the scene information, the agent application being configured to query the second client about the scene information.

14. The terminal according to claim 8, wherein the at least one processor is further configured to perform:
receiving from the server and forwarding to the second client a search result when the server does not find a media resource that matches a text converted from the first audio data, the second client being configured to display the search result.

15. A non-transitory computer readable storage medium, storing computer instructions that, when being executed by a processor, cause the processor to perform:
querying, using a first client installed on a first terminal, a second client on a second terminal about scene information, the scene information comprising information of at least one operable object in at least one display interface of the second client, the second client being configured to present a media resource based on the at least one operable object, the first terminal being a mobile terminal;
displaying, on the first client, a prompt message about voice recording based on the scene information, the prompt message being a reference for a user to issue a voice operation;
recording voice to obtain first audio data in response to an operation on a voice recording control of the first client on the first terminal;
transmitting the scene information and the first audio data to a server after the scene information returned by the second client is received, the server being a back-end server of the second client; and
transmitting after a control instruction is returned by the server, the control instruction to the second client to perform an action corresponding to the first audio data, the control instruction carrying information of a to-be-performed operable object.

16. The storage medium according to claim 15, wherein the transmitting the scene information and the first audio data to the server comprises:
transmitting the first audio data to the server, slice by slice in a streaming slice transmission mode, the scene information being carried in one slice of the first audio data.

17. The storage medium to claim 16, wherein the scene information is carried in a last slice of the first audio data.

18. The storage medium according to claim 15, wherein the computer instructions further cause the at least one processor to perform:
receiving second audio data transmitted by the server, the second audio data being formed by converting a text, the text being formed by converting the first audio data; and
playing the second audio data.

19. The storage medium according to claim 15, wherein the computer instructions further cause the at least one processor to perform:
receiving second audio data from the server, the second audio data being formed by converting a text, the text being formed by converting the first audio data; and
transmitting the second audio data to an agent application of the second terminal to be played by the agent application.

20. The storage medium according to claim 19, wherein the computer instructions further cause the at least one processor to perform:
querying an agent application of the second terminal about the scene information, the agent application being configured to query the second client about the scene information.

\* \* \* \* \*